United States Patent
Jeon (10) Patent No.: US 9,003,872 B2
(45) Date of Patent: Apr. 14, 2015

(54) BRAKE PEDAL SIMULATOR FOR VEHICLE

(71) Applicant: Hyundai Motor Company, Seoul (KR)

(72) Inventor: Gab Bae Jeon, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 154 days.

(21) Appl. No.: 13/710,048

(22) Filed: Dec. 10, 2012

(65) Prior Publication Data

US 2014/0116193 A1   May 1, 2014

(30) Foreign Application Priority Data

Oct. 26, 2012   (KR) .................. 10-2012-0119960

(51) Int. Cl.
| | | |
|---|---|---|
| G01M 17/00 | (2006.01) | |
| B60T 7/04 | (2006.01) | |
| B60T 8/32 | (2006.01) | |
| B60T 8/40 | (2006.01) | |
| G05G 5/03 | (2008.04) | |
| G05G 1/44 | (2008.04) | |

(52) U.S. Cl.
CPC ............ *B60T 7/042* (2013.01); *Y10T 74/20582* (2013.01); *B60T 8/3255* (2013.01); *B60T 8/4086* (2013.01); *G05G 1/44* (2013.01); *G05G 5/03* (2013.01)

(58) Field of Classification Search
CPC ............ G01L 5/28; G01M 17/00; G05G 1/44
USPC ................................. 73/121, 129, 132
See application file for complete search history.

(56) References Cited

U.S. PATENT DOCUMENTS

| | | | |
|---|---|---|---|
| 3,693,471 A * | 9/1972 | Glance | 74/518 |
| 3,709,344 A * | 1/1973 | Sieren | 477/167 |
| 2004/0074692 A1* | 4/2004 | Rupiper et al. | 180/336 |

FOREIGN PATENT DOCUMENTS

| | | |
|---|---|---|
| JP | 2003-312458 A | 11/2003 |
| JP | 2006-264632 A | 10/2006 |
| JP | 2009-262682 B2 | 11/2009 |
| KR | 1998-0007330 U | 4/1998 |
| KR | 1020080051321 A | 6/2008 |

\* cited by examiner

*Primary Examiner* — Eric S McCall
(74) *Attorney, Agent, or Firm* — Morgan, Lewis & Bockius LLP (57) ABSTRACT

A brake pedal simulator apparatus for a vehicle for implementing a change in a foot effort applied to a brake pedal for each stroke, may include a pedal arm including one end hinge-connected to one side of a frame and the other end in which a pad may be mounted, a link unit including a plurality of links mutually connected between the frame and the pedal arm, and an elastic member elastically supporting the link unit and configured to form reaction force by elastic force in the pedal arm according to the each stroke by the foot effort applied to the pedal arm.

11 Claims, 8 Drawing Sheets

BRAKE PEDAL SIMULATOR FOR VEHICLE

CROSS-REFERENCE TO RELATED APPLICATION

The present application claims priority to Korean Patent Application No. 10-2012-0119960 filed on Oct. 26, 2012, the entire contents of which is incorporated herein for all purposes by this reference.

BACKGROUND OF THE INVENTION

Field of the Invention

The present invention relates to a brake pedal simulator for a vehicle, and more particularly, to a brake pedal simulator for a vehicle for implementing a change in a foot effort of a brake pedal according to a change in a stroke.

Description of Related Art

In general, a brake pedal unit of a vehicle includes a pedal mounting bracket installed inside a vehicle cabin between a dash panel and a cowl panel, an operation lever hinge-connected to one side of the pedal mounting bracket, and a pedal under the operation lever.

A spring is installed between the pedal mounting bracket and the operation lever for restoration of the operation lever.

The operation lever is connected with a push rod of a brake booster at one side to provide the brake booster with operation force.

Accordingly, when a driver steps on the pedal, a foot effort applied to the pedal is amplified by the brake booster to operate a master cylinder, and the master cylinder generates hydraulic pressure and provides each wheel cylinder with the generated hydraulic pressure to generate braking force.

A brake pedal simulator for reproducing an operation of the brake pedal unit is configured and tested before applying the brake pedal unit to an actual vehicle.

In a case of an electric brake, a method of operating the brake pedal simulator includes a method of transmitting the amount of flow inside one cylinder to the other cylinder so as to implement the same sensitivity of a pedal feel as that of a hydraulic brake and a method of using two or more springs or an elastic member, such as rubber, inside the cylinder.

Figure 8:
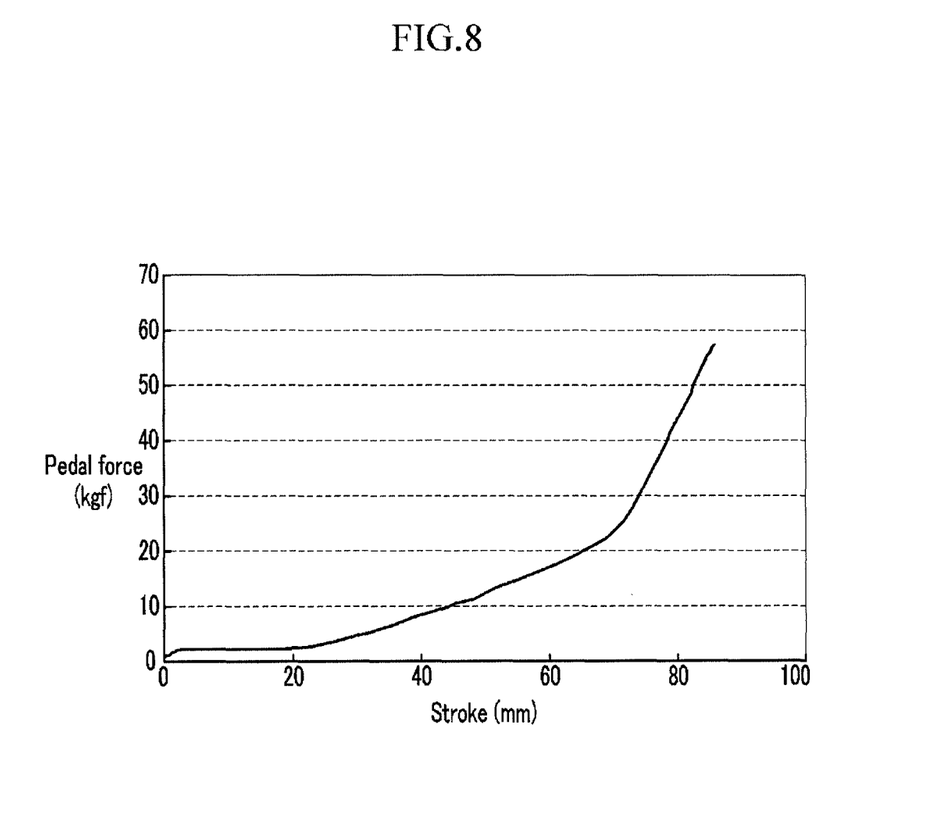
FIG. 8 is a graph illustrating a relation between a stroke and a foot effort of a brake pedal of an actual vehicle.

FIG. 8 is a graph illustrating a relation between a stroke and a foot effort of a brake pedal of an actual vehicle.

As illustrated in FIG. 8, it can be seen that reaction force for the stroke of the brake pedal of the actual vehicle gradually increases with a small inclination at a section in which the stroke is small, and then an inclination of reaction force of the stroke for the foot effort increases according to the increase of the stroke.

However, in a general brake pedal simulator for a vehicle, when a foot effort is generated by using the springs inside the master cylinder, a spring constant is fixed. Accordingly, when a foot effort inclination is changed from a section in which an initial effort inclination is small to a section in which a foot effort inclination after the middle is high, there is a problem in that a sense of difference (feeling that the foot effort suddenly becomes heavy) is generated. That is, a section in which the reaction force for the brake pedal sharply increases is generated.

Further, when rubber is used, there is a problem in that hardness of rubber is changed according to a change in a temperature and thus a foot effort is also changed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a brake pedal simulator for a vehicle having advantages of implementing a change in foot effort of a brake pedal according to a change in stroke so as to be similar to that of an actual vehicle by using a link structure and an elastic member.

In an aspect of the present invention, a brake pedal simulator apparatus for a vehicle for implementing a change in a foot effort applied to a brake pedal for each stroke, may include a pedal arm including one end hinge-connected to one side of a frame and the other end in which a pad is mounted, a link unit including a plurality of links mutually connected between the frame and the pedal arm, and an elastic member elastically supporting the link unit and configured to form reaction force by elastic force in the pedal arm according to the each stroke by the foot effort applied to the pedal arm.

The link unit may include first and third links arranged while being widened, one ends of the first and third links being hinge-connected to a first hinge point formed in the frame, respectively, and second and fourth links arranged while being widened, one ends of the second and fourth links being hinge-connected to a second hinge point formed in the pedal arm, respectively, wherein the other end of the second link is hinge-connected to the other end of the first link and the other end of the fourth link is hinge-connected to the other end of the third link.

The first, second, third, and fourth links are connected with each other to form a rhombus shape.

The elastic member is formed of a spring of which both ends are connected between a hinge connection portion to which the other ends of the first and second links are hinge-connected and a hinge connection portion to which the other ends of the third and fourth links are hinge-connected.

The brake pedal simulator apparatus mat further may include a first hinge assembly having one end in which one end of the elastic member is inserted and the other end in which the other ends of the first link and the second link are hinge-connected, and a second hinge assembly having one end in which the other end of the elastic member is inserted and the other end in which the other ends of the third link and the fourth link are hinge-connected.

The brake pedal simulator apparatus may further may include a first hinge pin configured to connect the other ends of the first link and the second link with the first hinge assembly, and a second hinge pin configured to connect the other ends of the third link and the fourth link with the second hinge assembly.

A ring recess is formed at an exterior circumferential surface of an end of the first and second hinge pin respectively, and a snap ring is fitted to the ring recess respectively.

The link unit may include a first link of which one end is hinge-connected to a first hinge point formed in the frame, and a second link of which one end is hinge-connected to a second hinge point formed at the pedal arm and of which the other end is hinge-connected to the other end of the first link.

The elastic member is formed of a spring connected between a hinge connection portion to which the other ends of the first and second links are connected and the frame.

The brake pedal simulator apparatus may further may include a hinge assembly having one end in which the elastic member is inserted and the other end hinge-connected with the other ends of the first link and the second link.

The brake pedal simulator apparatus may further may include a hinge pin configured to connect the first link, the second link, and the hinge assembly.

A ring recess is formed at an exterior circumferential surface of an end of the hinge pin, and a snap ring is fitted to the ring recess.

According to the exemplary embodiment of the present invention, it is possible to implement a change in foot effort of the brake pedal according to a change in a stroke with a simple structure using the link unit and the elastic member.

Accordingly, it is possible to reduce manufacturing cost by removing a complex structure by a cylinder and a piston structure in the related art, and particularly, it is possible to solve a characteristic change problem according to a change in a temperature by the application of rubber in the related art.

Further, it is possible to implement a pattern in which reaction force is mechanically and continuously increased according to the application of the spring as the elastic member, and prevent a reaction force increase discontinuous section in the related art from being generated, thereby improving sensitivity of a pedal feel.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

However, a size and a thickness of each element illustrated in the drawing are arbitrarily represented for the convenience of description, so that the present invention is not essentially limited to the drawings, and a thickness is expanded in order to clearly express several parts and regions.

Further, a part irrelevant to the description will be omitted so as to clearly describe exemplary embodiments of the present invention.

Figure 1:
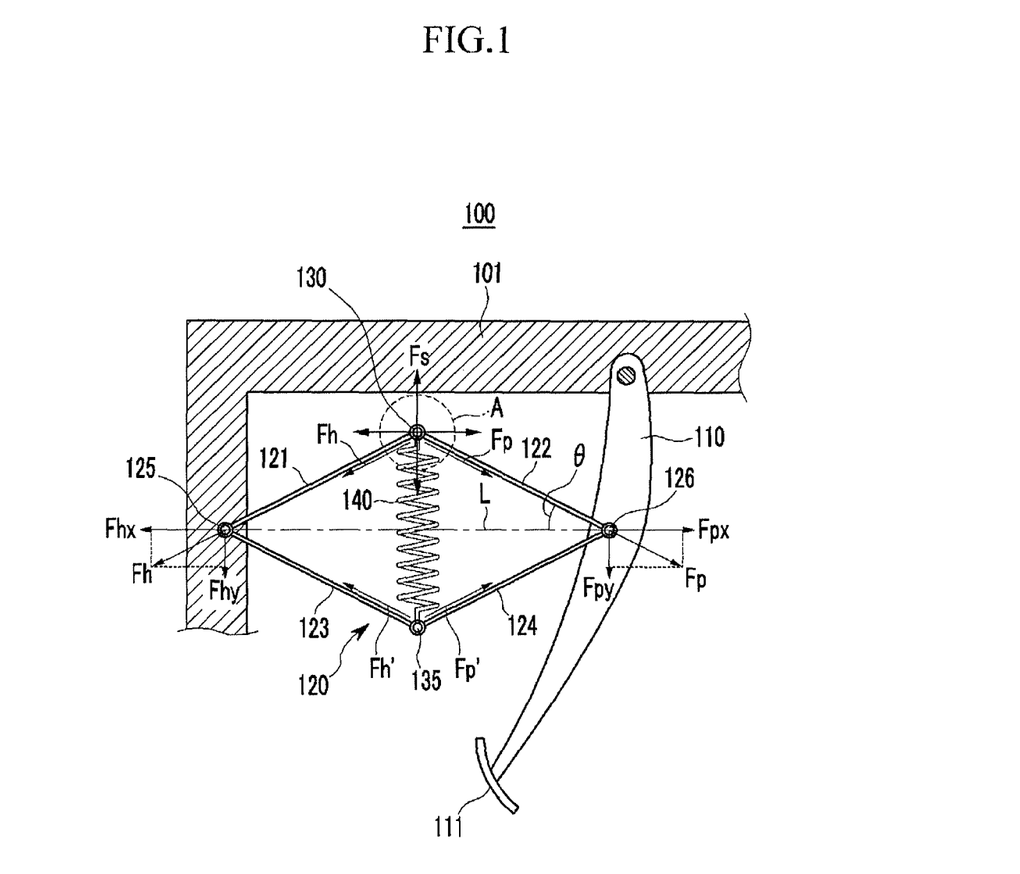
FIG. 1 is a configuration diagram of a brake pedal simulator for a vehicle according to various exemplary embodiments of the present invention.
Figure 2:
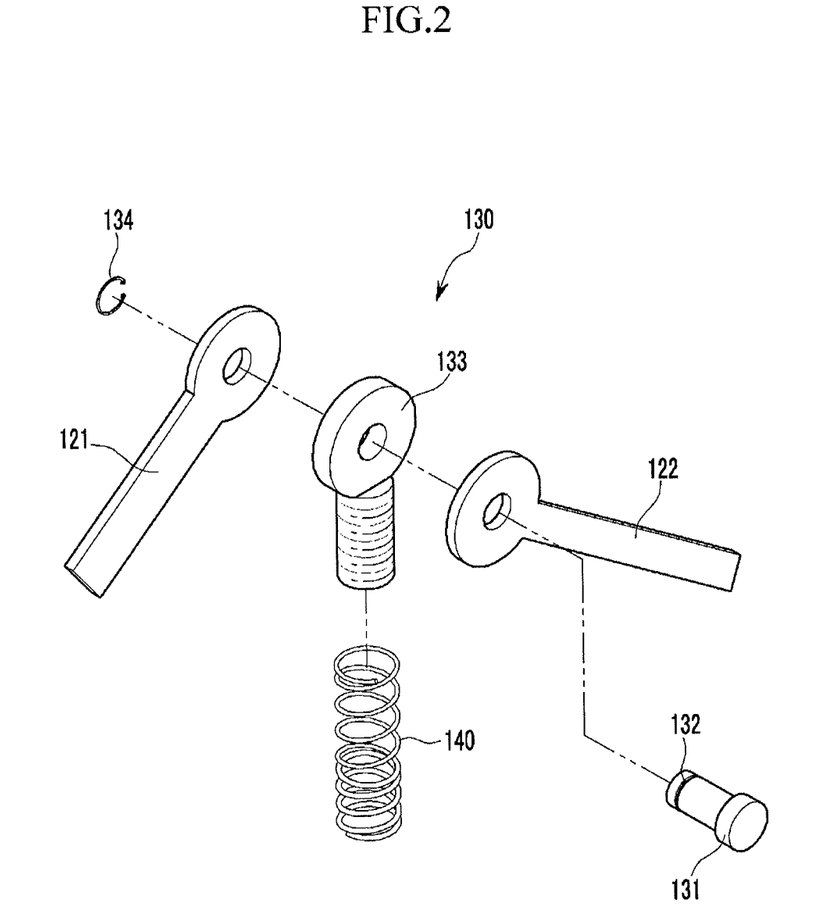
FIG. 2 is an exploded perspective view illustrating enlarged part A of FIG. 1.
Figure 3:
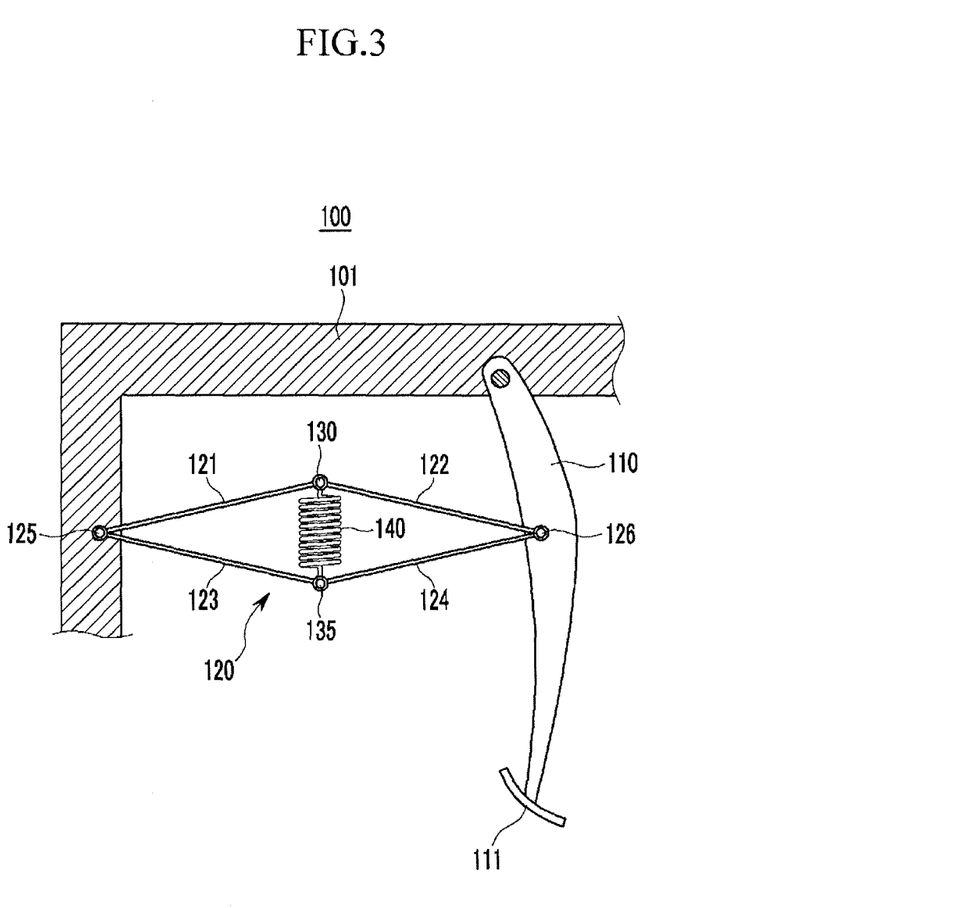
FIG. 3 is a view of an operation state of the brake pedal simulator for the vehicle according to the various exemplary embodiments of the present invention.

FIG. 1 is a configuration diagram of a brake pedal simulator for a vehicle according to a first exemplary embodiment of the present invention, FIG. 2 is an exploded perspective view illustrating enlarged part A of FIG. 1, and FIG. 3 is a view of an operation state of the brake pedal simulator for the vehicle according to the first exemplary embodiment of the present invention.

Referring to FIGS. 1 to 3, a brake pedal simulator 100 for a vehicle according to the first exemplary embodiment of the present invention is for implementing reaction force for a brake pedal for each stroke, and includes a pedal arm 110, a link unit 120, and an elastic member 140.

One end of the pedal arm 110 is hinge-connected to a frame 101, and a pad 111 is mounted at the other end thereof.

Further, the link unit 120 includes a plurality of links mutually connected between the frame 101 and the pedal arm 110.

Here, the link unit 120 includes a first link 121, a second link 122, a third link 123, and a fourth link 124.

One end of each of the first and third links 121 and 123 is connected to a first hinge point 125 formed in the frame 101 so that the first and third links 121 and 123 are arranged while being widened at a predetermined angle.

One end of each of the second and fourth links 122 and 124 is connected to a second hinge point 126 formed in the pedal arm 110 so that the second and fourth links 122 and 124 are arranged while being widened at a predetermined angle, and the other ends of the first link 121 and the second links 122 are hinge-connected with each other, and the other ends of the third link 123 and the fourth link 124 are hinge-connected to each other.

The first, second, third, and fourth links 121, 122, 123, and 124 are connected to each other to form a rhombus shape.

In the first exemplary embodiment of the present invention, the elastic member 140 is included in the link unit 120, to form reaction force for a foot effort of the pedal arm 110 according to a stroke of the pedal arm 110.

The elastic member 140 may be formed of a spring of which both ends are connected between a hinge connection portion 130 of the mutually hinge-connected first and second links 121 and 122 and a hinge connection portion 135 of the third and fourth links 123 and 124, respectively.

Here, an end of the spring is coupled to each of the hinge connection portions 130 and 135. That is, each of the first link 121, the second link 122, the third link 123, and the fourth link 124 is connected with the elastic member 140 through the hinge assemblies 133. The elastic member 140 is inserted in one end of the hinge assembly 133, and the other end of the hinge assembly 133 is hinge-connected with each of the first link 121 and the second link 122, and the third link 123, and the fourth link 124 respectively. Further, a hinge pin 131 is adapted to connect the first link 121 and the second link 122, and the third link 123 and the fourth link 124 with the hinge assembly 133 respectively.

Further, a ring recess 132 is formed at an exterior circumferential surface of an end of the hinge pin 131 and a snap ring 134 is fitted to the ring recess 132 to prevent the hinge pin 131 from being separated from the hinge connection portions 130 and 135 respectively.

Hereinafter, a method of operating the brake pedal simulator for the vehicle having the aforementioned configuration will be described.

Referring to FIGS. 1 and 3, in the brake pedal simulator 100 for the vehicle according to the first exemplary embodiment of the present invention, when a driver provides a foot effort to the pedal arm 110, the second hinge point 126 of the pedal arm 110 almost horizontally moves, and vertical and horizontal force is transmitted to the hinge connection portion 130 of the first and second links 121 and 122 and the hinge connection portion 135 of the third and fourth links 123 and 124.

An equilibrium equation of force at the hinge connection portion 130 is as follows.

$$Fs = Fp + Fh$$

An equilibrium equation of force in a vertical direction (y-axis direction) is as follows.

$$Fs = Fpy + Fhy$$

An equilibrium equation of force in a horizontal direction (x-axis direction) is as follows.

$$Fpx = Fhx$$

A subscript x and a subscript y means x and y direction respectively.

When it is assumed that lengths of the respective links 121, 122, 123, and 124 are the same, force equilibrium and vertical/horizontal force in the other hinge connection portion 135 symmetrically acts with the same size.

Fp and Fh have the same size, and Fpx and Fhx have the same size.

The size of Fpx and Fhx is as follows by force equilibrium.

$$Fpx = Fhx = 0.5 * Fs / \text{SIN} \, \Theta$$

The displacement of the hinge connection portion 130 causes a movement in the x-axis direction of the second hinge point 126 and the movement in the x-axis direction of the second hinge point 126 varies Fs.

At the hinge connection portion 135, Fpx' and Fhx' are generated from the force applied to the hinge connection portion 135 and the third and fourth links 123 and 124 similar to the Fpx and Fhx.

The reaction force applied to the second hinge point 126 is the sum of Fpx and Fpx'.

The reaction force applied to the second hinge point 126 is Fpx+Fpx'.

The foot effort sensed by the driver is a multiply of the reaction force and a pedal ratio.

$$\text{Foot Effort (at PEDAL)} = (Fpx + Fpx') \times \text{pedal ratio}$$

Here, the pedal ratio is a length ratio between the second hinge point 126 and the pad 111 from the connection position of the pedal arm 110 and the frame 101.

Figure 7:
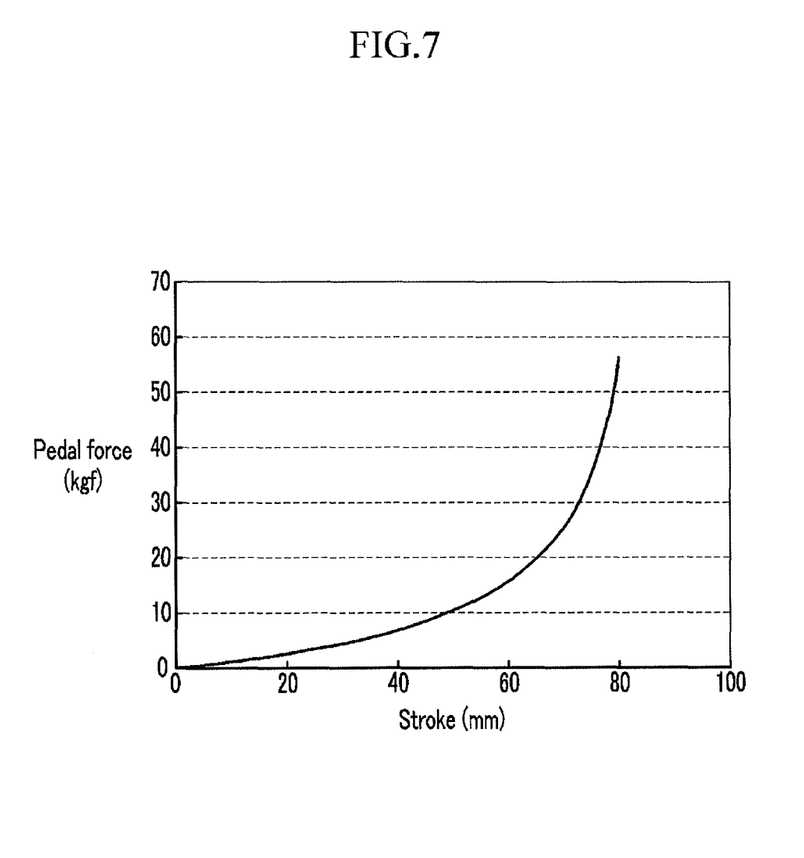
FIG. 7 is a graph illustrating a relation between a stroke and a foot effort of a brake pedal simulator for a vehicle according to an exemplary embodiment of the present invention.

FIG. 7 is a graph illustrating a relation between a stroke and a foot effort of the brake pedal simulator for the vehicle according to the exemplary embodiment of the present invention.

Referring to FIGS. 7 and 8, it can be seen that the relation between the stroke and the foot effort of the brake pedal simulator for the vehicle according to the exemplary embodiment of the present invention is similar to the relation between a stroke and a foot effort of an actual vehicle.

Further, pedal (foot) effort according to a movement of the second hinge point 126 may be adjusted by adjusting a length of each of the links 121, 122, 123, and 124, initial positions of the hinge connection portion 130 and the second hinge point 126, the pedal ratio, and the spring constant.

Hereinafter, a brake pedal simulator for a vehicle according to a second exemplary embodiment of the present invention will be described.

Figure 4:
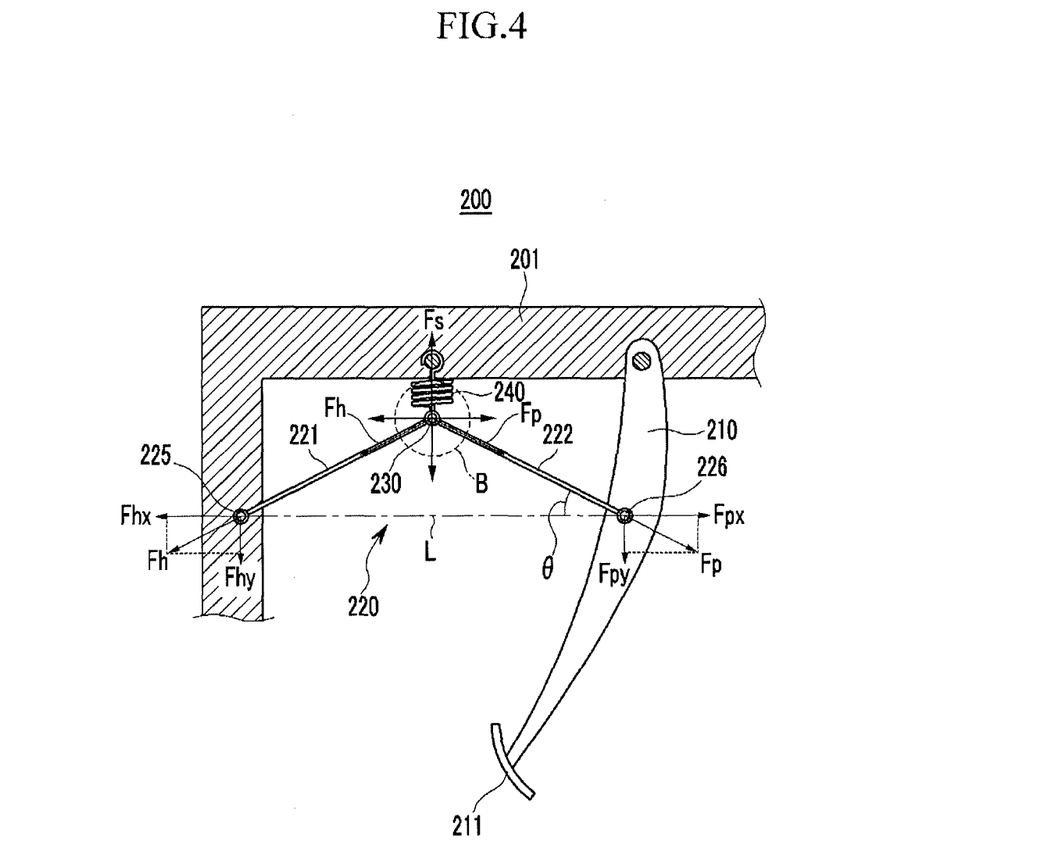
FIG. 4 is a configuration diagram of a brake pedal simulator for a vehicle according to various exemplary embodiments of the present invention.
Figure 5:
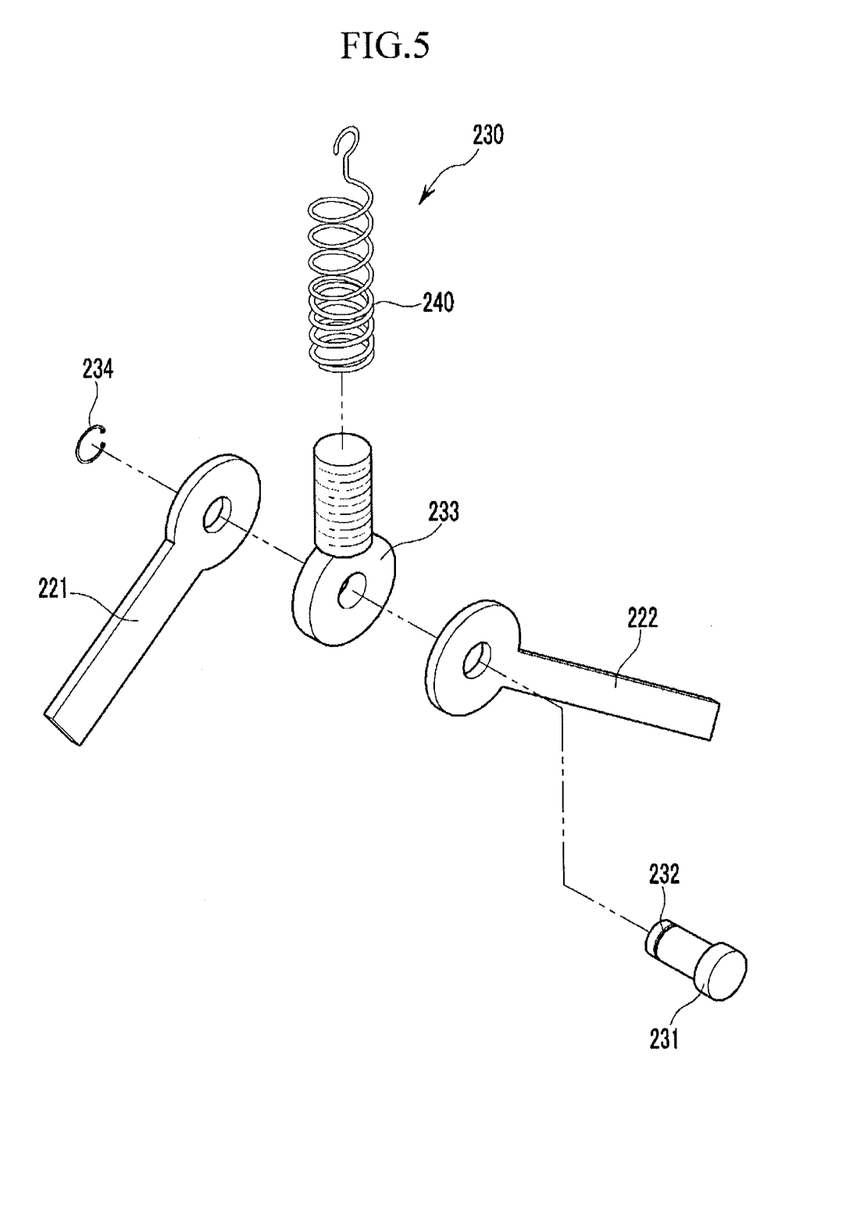
FIG. 5 is an exploded perspective view illustrating enlarged part B of FIG. 4.
Figure 6:
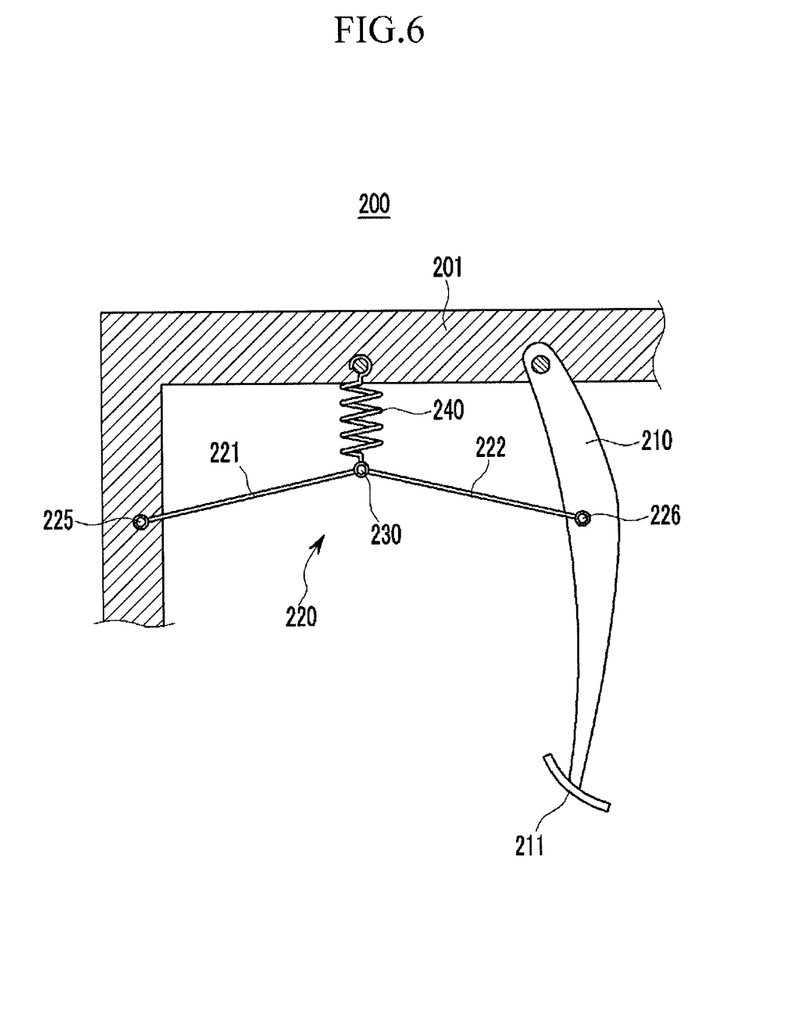
FIG. 6 is a view of an operation state of the brake pedal simulator for the vehicle according to the various exemplary embodiments of the present invention.

FIG. 4 is a configuration diagram of a brake pedal simulator for a vehicle according to a second exemplary embodiment of the present invention, FIG. 5 is an exploded perspective view illustrating enlarged part B of FIG. 4, and FIG. 6 is a view of an operation state of the brake pedal simulator for the vehicle according to the second exemplary embodiment of the present invention.

Referring to FIGS. 4 to 6, a brake pedal simulator 200 for a vehicle according to the second exemplary embodiment of the present invention is for implementing reaction force for a brake pedal for each stroke, and includes a pedal arm 210, a link unit 220, and an elastic member 240.

First, one end of the pedal arm 210 is hinge-connected to a frame 201, and a pad 211 is mounted at the other end thereof.

Further, the link unit 220 includes a plurality of links mutually connected between the frame 201 and the pedal arm 210.

Here, the link unit 220 includes a first link 221 and a second link 222, each of which will be described in detail below.

One end of the first link 221 is hinge-connected to a first hinge point 225 formed in the frame 201.

One end of the second link 222 is hinge-connected to a second hinge point 226 formed in the pedal arm 210, and the other end thereof is hinge-connected to the other end of the first link 221.

The elastic member 240 is included in the link unit 220, to form reaction force for a foot effort of the pedal arm 210 according to a stroke by the reaction force applied to the pedal arm 210.

The elastic member 240 may be formed of a spring connected between the hinge connection portion 230 of the first and second links 221 and 222 and a central one side of the frame 201.

Here, one end of the spring is coupled to the hinge connection portion 230. That is, ends of the links 221 and 222 are connected with the elastic member 240 through the hinge assembly 233. The elastic member 240 is inserted in one end of the hinge assembly 233, and the other end of the hinge assembly 233 is hinge-connected with the first link 221 and the second link 222. Further, a hinge pin 231 is included to connect the first link 221 and the second link 222 to the hinge assembly 233.

Further, a ring recess 232 is formed at an exterior circumferential surface of an end of the hinge pin 231 and a snap ring 234 is fitted to the ring recess 232 to prevent the hinge pin 231 from being separated from the hinge connection portion 230.

Hereinafter, a method of operating the brake pedal simulator for the vehicle according to the second exemplary embodiment of the present invention will be described.

Referring to FIGS. 4 to 6, in the brake pedal simulator 200 for the vehicle according to the second exemplary embodiment of the present invention, when a driver provides a foot effort to the pedal arm 210, the second hinge point 226 of the pedal arm 210 horizontally moves, and vertical and horizontal force is transmitted to the hinge connection portion 230 of the first and second links 221 and 222.

An operation and an effect of the brake pedal simulator 200 for the vehicle according to the second exemplary embodiment of the present invention are similar to those of the brake pedal simulator for the vehicle according to the first exemplary embodiment of the present invention, and thus a repeated description will be omitted.

For convenience in explanation and accurate definition in the appended claims, the terms "upper", "lower", "inner" and "outer", are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A brake pedal simulator apparatus for a vehicle for implementing a change in a foot effort applied to a brake pedal for each stroke, comprising:
   a pedal arm including one end directly hinge-connected to one side of a frame and the other end in which a pad is mounted;
   a link unit including a plurality of links mutually connected between the frame and the pedal arm; and
   an elastic member elastically supporting the link unit and configured to form reaction force by elastic force in the pedal arm according to the each stroke by the foot effort applied to the pedal arm,
   wherein the link unit includes:
   first and third links arranged while being widened, one ends of the first and third links being hinge-connected to a first hinge point formed in the frame, respectively; and
   second and fourth links arranged while being widened, one ends of the second and fourth links being hinge-connected to a second hinge point formed in the pedal arm, respectively,
   wherein the other end of the second link is hinge-connected to the other end of the first link and the other end of the fourth link is hinge-connected to the other end of the third link.

2. The brake pedal simulator apparatus for the vehicle of claim 1, wherein the first, second, third, and fourth links are connected with each other to form a rhombus shape.

3. The brake pedal simulator apparatus for the vehicle of claim 1, wherein the elastic member is formed of a spring of which both ends are connected between a hinge connection portion to which the other ends of the first and second links are hinge-connected and a hinge connection portion to which the other ends of the third and fourth links are hinge-connected.

4. The brake pedal simulator apparatus for the vehicle of claim 3, further including:
   a first hinge assembly having one end in which one end of the elastic member is inserted and the other end in which the other ends of the first link and the second link are hinge-connected; and
   a second hinge assembly having one end in which the other end of the elastic member is inserted and the other end in which the other ends of the third link and the fourth link are hinge-connected.

5. The brake pedal simulator apparatus for the vehicle of claim 4, further including:
   a first hinge pin configured to connect the other ends of the first link and the second link with the first hinge assembly; and
   a second hinge pin configured to connect the other ends of the third link and the fourth link with the second hinge assembly.

6. The brake pedal simulator apparatus for the vehicle of claim 5, wherein a ring recess is formed at an exterior circumferential surface of an end of the first and second hinge pin respectively, and a snap ring is fitted to the ring recess respectively.

7. A brake pedal simulator apparatus for a vehicle for implementing a change in a foot effort applied to a brake pedal for each stroke, comprising:
   a pedal arm including one end directly hinge-connected to one side of a frame and the other end in which a pad is mounted;
   a link unit including a plurality of links mutually connected between the frame and the pedal arm; and
   an elastic member elastically supporting the link unit and configured to form reaction force by elastic force in the pedal arm according to the each stroke by the foot effort applied to the pedal arm,
   wherein the link unit includes:
   a first link of which one end is hinge-connected to a first hinge point formed in the frame; and
   a second link of which one end is hinge-connected to a second hinge point formed at the pedal arm and of which the other end is hinge-connected to the other end of the first link.

8. The brake pedal simulator apparatus for the vehicle of claim 7, wherein the elastic member is formed of a spring connected between a hinge connection portion to which the other ends of the first and second links are connected and the frame.

9. The brake pedal simulator apparatus for the vehicle of claim 7, further including:
   a hinge assembly having one end in which the elastic member is inserted and the other end hinge-connected with the other ends of the first link and the second link.

10. The brake pedal simulator apparatus for the vehicle of claim 9, further including a hinge pin configured to connect the first link, the second link, and the hinge assembly.

11. The brake pedal simulator apparatus for the vehicle of claim 10, wherein a ring recess is formed at an exterior circumferential surface of an end of the hinge pin, and a snap ring is fitted to the ring recess.

* * * * *